(12) United States Patent
Cho

(10) Patent No.: US 11,391,402 B2
(45) Date of Patent: Jul. 19, 2022

(54) FLEXIBLE PIPE AND MANUFACTURING METHOD THEREOF

(71) Applicant: UNION CO., LTD., Cheonan-si (KR)

(72) Inventor: Kyung Sang Cho, Pyeongtaek-si (KR)

(73) Assignee: UNION CO., LTD., Cheonan-si (KR)

( * ) Notice: Subject to any disclaimer, the term of this patent is extended or adjusted under 35 U.S.C. 154(b) by 0 days.

(21) Appl. No.: 17/038,448

(22) Filed: Sep. 30, 2020

(65) Prior Publication Data

US 2021/0108746 A1  Apr. 15, 2021

(30) Foreign Application Priority Data

Oct. 10, 2019 (KR) .......................... 10-2019-0125407

(51) Int. Cl.
  *F16L 27/11* (2006.01)
  *F16L 51/02* (2006.01)
  *G01M 3/28* (2006.01)

(52) U.S. Cl.
  CPC ............. *F16L 27/11* (2013.01); *F16L 51/025* (2013.01); *G01M 3/2807* (2013.01)

(58) Field of Classification Search
  CPC ............................ F16L 51/025; G01M 3/2807
  USPC ....................................................... 138/104
  See application file for complete search history.

(56) References Cited

U.S. PATENT DOCUMENTS

| 2018/0009174 A1 | 1/2018 | Mencos |
| 2019/0195721 A1* | 6/2019 | Schumacher ...... G01N 33/0031 |
| 2020/0200295 A1* | 6/2020 | Di Carlo ............. F16L 13/0209 |

FOREIGN PATENT DOCUMENTS

| KR | 10-1997-0044707 A | 7/1997 |
| KR | 10-1075170 B1 | 10/2011 |
| KR | 20-0469608 Y1 | 10/2013 |
| KR | 10-1527882 B1 | 6/2015 |
| KR | 10-2017-0102630 A | 9/2017 |
| KR | 10-2017-0103250 A | 9/2017 |
| KR | 10-1842478 B1 | 5/2018 |
| KR | 10-1899336 B1 | 9/2018 |
| KR | 10-1981779 B1 | 5/2019 |

\* cited by examiner

*Primary Examiner* — Craig M Schneider
*Assistant Examiner* — David R Deal
(74) *Attorney, Agent, or Firm* — Novick, Kim & Lee, PLLC; Jae Youn Kim

(57) ABSTRACT

Disclosed are a flexible pipe and a manufacturing method thereof. The flexible pipe includes an outer bellows formed in a corrugated tubular shape with mountains and valleys, an inner bellows formed in a corrugated tubular shape with mountains and valleys and provided inside the outer bellows, a pair of flanges connected to both ends of the outer bellows and the inner bellows, respectively, and a detection unit for checking whether leakage occurs due to damage or breakage of the outer and inner bellows by detecting an amount of oxygen present in an air having an atmospheric pressure and filled in an atmospheric space between the outer and inner bellows. Leakage due to damage or breakage of the outer and inner bellows can be detected based on variation in the amount of oxygen present in the space between the outer bellows and the inner bellows.

2 Claims, 3 Drawing Sheets

FLEXIBLE PIPE AND MANUFACTURING METHOD THEREOF

CROSS-REFERENCE TO RELATED APPLICATION

This application claims priority to and the benefit of Korean Patent Application No. 10-2019-0125407, filed on Oct. 10, 2019, the disclosure of which is incorporated herein by reference in its entirety.

BACKGROUND OF THE INVENTION

1. Field of the Invention

The present invention relates to a flexible pipe and a method of manufacturing the same, and more particularly, to a flexible pipe used for connecting a vacuum line between components of semiconductor manufacturing equipment and a method of manufacturing the same.

2. Description of Related Art

In general, a semiconductor manufacturing process refers to a series of processes that are repeatedly performed on a silicon wafer such as an oxidation process, a diffusion process, a photo process, an etching process, an ion implantation process, a deposition process, and a metal wiring process. Most of the semiconductor manufacturing equipment performing each of these processes is kept in a high vacuum state in order to prevent properties of semiconductor devices from deteriorating or yield degradation due to foreign substances such as dust particles during the processes.

Most semiconductor manufacturing equipment that requires the vacuum environment is provided with a vacuum device for creating the vacuum environment, and the vacuum device mainly includes a vacuum pump, a vacuum line, and an exhaust line.

One side of the vacuum line is connected to semiconductor manufacturing equipment requiring the vacuum environment, the other side is connected to the vacuum pump, and the exhaust line is connected to one side of the vacuum pump.

Accordingly, the interior of the semiconductor equipment is maintained in a vacuum state by operating the vacuum pump, and by-products generated after the process is performed inside the semiconductor manufacturing equipment are sucked into the vacuum pump through the vacuum line and discharged through the exhaust line.

The vacuum line of the vacuum device connects the semiconductor manufacturing equipment requiring the vacuum environment and the vacuum pump, and a bellows having flexible and stretchable properties is used at locations where the piping structure of the semiconductor manufacturing equipment is complicated or flexibility is required because the vacuum line of the vacuum device cannot be connected horizontally or vertically due to the installation position of the semiconductor manufacturing equipment and the vacuum device.

Flanges are coupled to both side ends of a typical bellows, so the bellows can be connected to an exhaust line, a vacuum pump, and a semiconductor process chamber through the flanges.

That is, during the etching, chemical vapor deposition (CVD), metallization, and diffusion processes of a semiconductor and a display, a large amount of solid or melted by-products are generated in chambers, fore lines, exhaust lines, etc. If such materials are accumulated inside the vacuum pipe, they may cause a degradation in equipment performance, a decrease in production yield, and a contamination of a particle source as well as an inside of a chamber due to the back stream of the accumulated materials.

The etching process following the CVD is the most basic process in the manufacturing process for a flat display or a semiconductor, in which a plurality of thin film layers representing the characteristics of a semiconductor or an insulator are very precisely formed and a switch pattern, which is a semiconductor, is formed through the etching.

In order to induce the above reaction, only a small amount of various process gases supplied to the chamber is used, and most process gases are discharged through an exhaust pipe.

Documents of Related Art

[Patent Documents]
(Patent Document 0001) Korean Registered Utility Model Publication No. 20-0469608 (issued on Oct. 23, 2013)
(Patent Document 0002) Korean Registered Patent Publication No. 10-1075170 (issued on Oct. 19, 2011)
(Patent Document 0003) Korean Registered Patent Publication No. 10-1981779 (issued on May 24, 2019)

SUMMARY OF THE INVENTION

However, since the bellows is manufactured through a hydroforming process at a high pressure of about 30 to 100 bar, it is difficult to check whether the bellows is doubly formed once a mountain portion is formed, and since the pitting corrosion occurs inside and outside the bellows simultaneously, it is practically impossible to detect whether the corrosion occurs within the double bellows.

In order to solve the above problems, there has been proposed a technique for detecting leakage by injecting argon (AR) gas at a pressure of about 4 bar in a space within the double bellows when an inner corrugated pipe is damaged.

However, since the double bellows is formed at a high pressure of about 30 to 100 bar, there is no space for injecting the argon gas between an inner bellows and an outer bellows.

In addition, even if it is possible to inject the argon gas within the double bellows, since the bellows is stretched in the longitudinal direction until the pressure applied from the outside and the axial spring force of the bellows are balanced, there is a problem that the product does not maintain the normal shape.

Further, since the bellows loses flexibility and becomes rigid in a state in which the argon gas is injected, there is a problem that the bellows cannot be mounted in a state in which the gas is injected.

Meanwhile, a technique for detecting leakage by installing a mechanical pressure sensor for detecting a pressure change due to leakage within the double bellows has been proposed.

However, when a perforation occurs in the inner bellows due to corrosion, the pressure does not increase due to leakage even if the temperature rises up to 200° C., so there was a limitation to accurately detect the leakage of the bellows only based on the pressure change.

In addition, in case to detect the leakage by injecting helium gas mainly used for leakage detection into the double bellows, there is a problem that the manufacturing cost of a flexible pipe increases as an expensive sensor is required.

Further, since a pressing portion for pressurizing an inside of the double bellows is provided only in a head, it is impossible to directly apply the pressure within the double bellows, so only the leakage occurring in an inlet flange portion and a bellows welding portion can be detected, and leak detection is not possible if the pitting corrosion occurs in the middle of the bellows.

Therefore, there is a need to develop a technique capable of detecting leakage between an inner bellows and an outer bellows while securing flexibility of the double bellows.

The present invention has been proposed to solve the above problems and an object of the present invention is provide a flexible pipe capable of detecting leakage that causes corrosion in a flexible pipe to which a bellows is applied and a method of manufacturing the same.

Another object of the present invention is to provide a flexible pipe capable of inspecting leakage by using variation in amount of oxygen detected in a space within a double bellows and a method of manufacturing the same.

In order to achieve the above objects, a flexible pipe according to the present invention detects an amount of oxygen present in a space between a plurality of pipes disposed outside and inside, and detects the leakage from at least one of the plurality of pipes based on variation in amount of oxygen.

In order to achieve the above objects, the present invention provides a flexible pipe including an outer bellows formed in a corrugated tubular shape with mountains and valleys, an inner bellows formed in a corrugated tubular shape with mountains and valleys and provided inside the outer bellows, a pair of flanges connected to both ends of the outer bellows and the inner bellows, respectively, and a detection unit for checking whether leakage occurs due to damage or breakage of the outer bellows and the inner bellows by detecting an amount of oxygen present in an air having an atmospheric pressure and filled in an atmospheric space between the outer bellows and the inner bellows.

Further, in order to achieve the above objects, the present invention provides a method of manufacturing a flexible pipe, which includes the steps of (a) providing an outer pipe and an inner pipe by processing a plate-shaped raw material into a pipe shape, (b) forming mountains and valleys on the outer pipe and the inner pipe to form an outer bellows and an inner bellows, respectively, and inserting the inner bellows formed with the mountains and valleys into the outer bellows formed with the mountains and valleys, thereby providing a double bellows, (c) connecting a pair of flanges to both ends of the double bellows, and mounting the double bellows to equipment to be installed, and (d) coupling a detection unit having an oxygen sensor to the flanges, wherein the detection unit generates a detection signal by detecting an amount of oxygen present in an air having an atmospheric pressure and filled in an atmospheric space formed in the double bellows, and a control terminal inspects leakage of the double bellows based on variation in an amount of oxygen corresponding to the detection signal of the detection unit.

As described above, the flexible pipe and the manufacturing method thereof according to the present invention can detect the leakage caused the damage or breakage of the inner and outer bellows based on variation in amount of oxygen present in the space between the outer bellows and the inner bellows.

Therefore, according to the present invention, the flexible pipe can be easily installed in equipment while securing the flexibility of the flexible pipe, and it is possible to accurately inspect the leakage of gas according to the variation in amount of oxygen present in the space within the double bellows.

In addition, according to the present invention, the process of injecting gas into the space between the outer bellows and the inner bellows required in the related art can be omitted, so that the workability can be improved when manufacturing the flexible pipe.

As a result, according to the present invention, the double bellows can be prevented from being corroded by quickly detecting the leakage due to the damage or breakage of the inner bellows.

Further, according to the present invention, a lifespan of 2 years or more can be ensured only with a built-in battery by adopting an oxygen sensor that requires very little driving power compared to a pressure sensor adopted in the related art.

DETAILED DESCRIPTION OF THE INVENTION

Hereinafter, a flexible pipe and a method of manufacturing the same according to an exemplary embodiment of the present invention will be described in detail with reference to the accompanying drawings.

Figure 1:
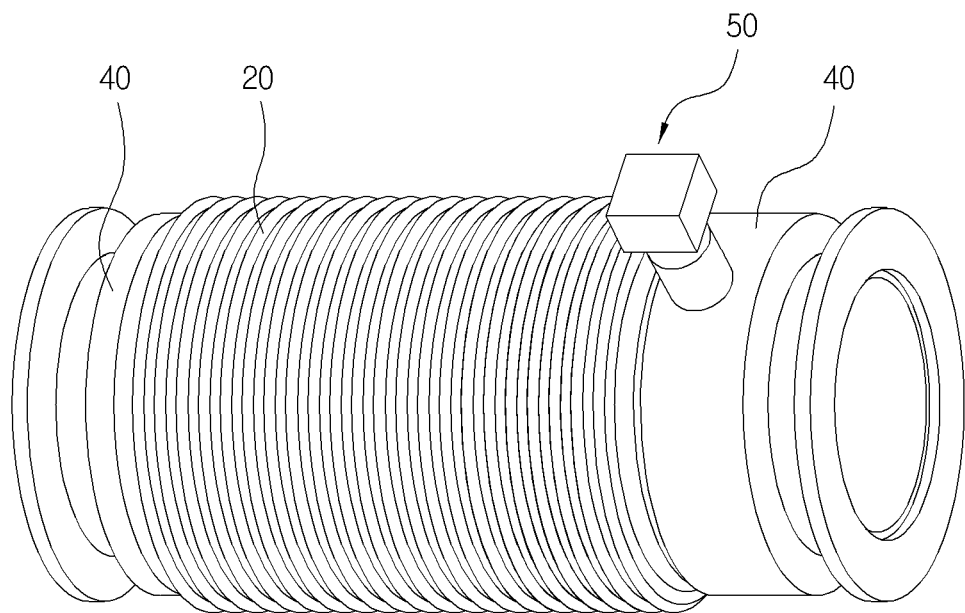
FIG. 1 is a perspective view of a flexible pipe according to an exemplary embodiment of the present invention.
Figure 2:
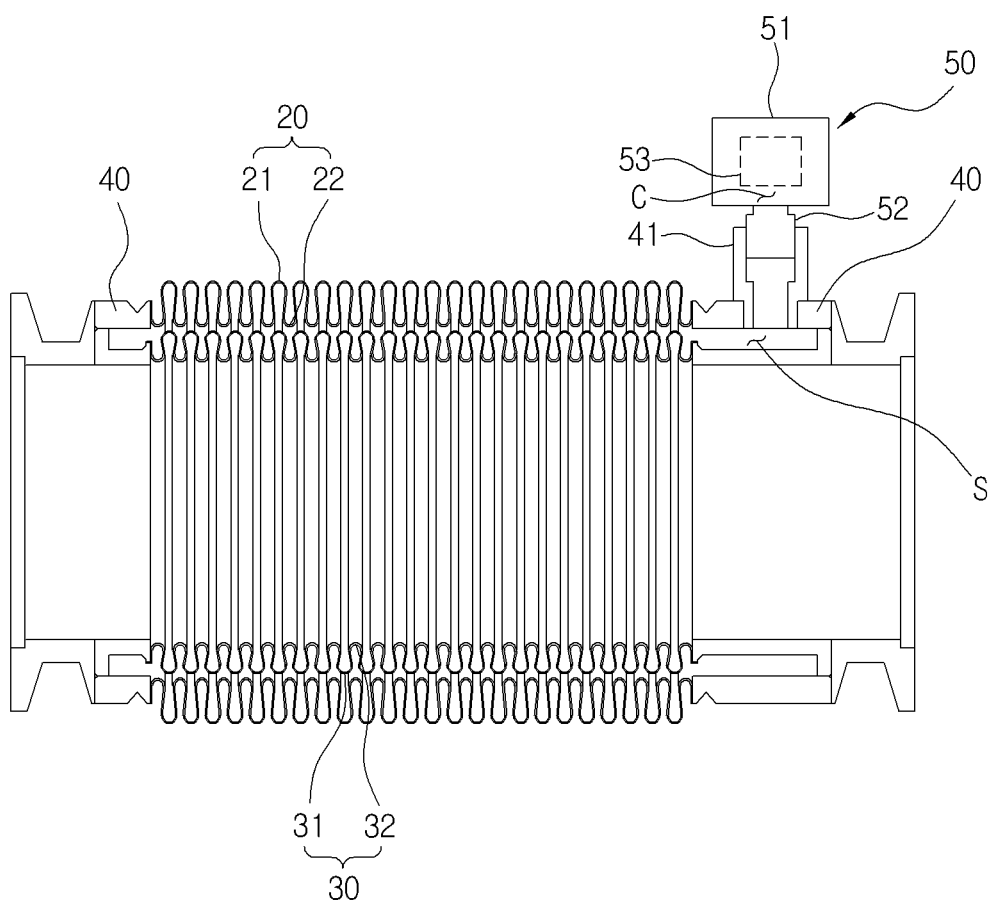
FIG. 2 is a sectional view of the flexible pipe shown in FIG. 1.

FIG. 1 is a perspective view of a flexible pipe according to an exemplary embodiment of the present invention, and FIG. 2 is a sectional view of the flexible pipe shown in FIG. 1.

In the following description, terms indicating directions such as 'left', 'right', 'front', 'rear', 'upward' and 'downward' may be defined based on the state shown in each drawing.

As shown in FIGS. 1 and 2, a flexible pipe 10 according to an exemplary embodiment of the present invention may include an outer bellows 20 formed in a corrugated tubular shape with mountains 21 and valleys 22, an inner bellows 30 formed in a corrugated tubular shape with mountains 31 and valleys 32 and provided inside the outer bellows 20, a pair of flanges 40 connected to both ends of the outer bellows 20 and the inner bellows 30, respectively, and a detection unit 50 for checking whether leakage occurs due to damage or breakage of the outer bellows 20 and the inner bellows 30 by detecting an amount of oxygen present in a space between the outer bellows 20 and the inner bellows 30.

As shown In FIGS. 2 and 3A-3C, the outer bellows 20 and the inner bellows 30 may be formed in a corrugated tubular shape having flexibility by forming mountains and valleys on an outer pipe 23 and an inner pipe 33 formed of a metal material or a synthetic resin material through a hydroforming process.

An atmospheric space S in which air having an atmospheric pressure is filled may be formed between the outer bellows 20 and the inner bellows 30.

Meanwhile, the inventor of the present invention has disclosed a technique for detecting the leakage using a pressure space having a preset pressure which is formed by injecting an agent such as dry ice or carbon dioxide between the outer bellows 20 and the inner bellows 30, which is disclosed in above Patent Document 3 and now registered as a patent.

However, according to Patent Document 3, a separate pressure space having a pressure is required between the outer bellows 20 and the inner bellows 30, and it is necessary to perform a process for injecting fluid having a long half-life due to a chemical reaction such as dry ice or carbon dioxide into the pressure space. In addition, the technique disclosed in Patent Document 3 cannot be used for a long time after being installed in an exhaust line. Further, in case of equipment where the exhaust line is frequently replaced, a process for injecting a fluid into the pressure space has to be performed whenever the exhaust line is replaced.

In contrast, according to the present embodiment, the atmospheric space S serves as a space where air having an atmospheric pressure is filled and the process for injecting the agent at a set pressure is eliminated.

Therefore, the present invention can improve the workability when manufacturing the flexible pipe by eliminating the process for forming a pressure space and injecting an agent into the pressure space disclosed in Patent Document 3, and simply forming a space filled with air having the atmospheric pressure.

The pair of flanges 40 may be connected to both ends of the outer bellows 20 and the inner bellows 30, respectively, and may have a function to shield both ends of the space S between the outer bellows 20 and the inner bellows 30.

Any one of the pair of flanges 40, for example, when viewed in FIG. 2, the right flange 40 may be provided with a coupling rib 41 to which a detection unit 50 is coupled.

For example, the coupling rib 41 may be formed in a substantially cylindrical shape with an opened upper surface and an opened lower surface, and may protrude from an upper surface of the right flange 40.

The detection unit 50 may be manufactured as an individual component so as to be coupled to the right flange 40, and a detection space C inside the detection unit 50 may communicate with THE atmospheric space S formed between the outer bellows 20 and the inner bellows 30 when coupled with the right flange 40.

To this end, the detection unit 50 may include a body 51 formed in an approximately cylindrical or hexahedral shape, a coupling portion 52 provided at a lower portion of the body 50 and coupled to the coupling rib 41 of the flange 40, and an oxygen sensor 53 for detecting an amount of oxygen present in the detection space C and the atmospheric space S in a state in which the detection space C communicates with the atmospheric space S.

A battery (not shown) for supplying power to the oxygen sensor 53 may be accommodated inside the body 51.

The coupling portion 52 may have a substantially cylindrical shape or a hexahedral shape and protrude downward so as to be coupled to the coupling rib 41 of the right flange 40.

The oxygen sensor 53 may be installed in the body 51 and may output a detection signal corresponding to an amount of oxygen by detecting the amount of oxygen present in the detection space C and the atmosphere space S provided inside the detection unit 50. The detection signal may be transmitted to a control terminal (not shown).

Then, the control terminal may receive the detection signal, and check whether leakage occurs due to damage or breakage of the outer and inner bellows 20 and 30 based on variation in the amount of oxygen present in the detection space C and the atmosphere space S.

That is, when the flexible pipe 10 is installed on the vacuum line connected to the vacuum chamber, the atmosphere air containing oxygen may be filled inside the space S.

When the inner bellows 30 is corroded by exhaust gas, the inner bellows 30 may be damaged or broken and the exhaust gas may be discharged. In this case, the exhaust gas, for example, hydrogen fluoride (HF) or hydrogen chloride (HCl) may react chemically with oxygen present in the atmospheric space S, so that water (H2O) may be generated and the amount of oxygen present in the atmospheric space (S) may be reduced.

Therefore, when the amount of oxygen detected in the atmospheric space S is less than a preset reference value, the control terminal may determine that the leakage occurs due to the damage or breakage of the inner bellows 30.

In general, about 21% of oxygen is present in the atmosphere, and the reference value may be set to a preset value through experiments, for example, may be set to about 18%. The reference value may be variously changed and set according to various conditions, such as the standard, the temperature, and the pressure of the vacuum line to which the flexible pipe 10 is applied.

Meanwhile, when a high-precision oxygen sensor capable of measuring the amount of oxygen in units of several ppm is applied to the detection unit 50, a chattering phenomenon of the detection signal may occur according to variation in the amount of oxygen.

In this regard, a relatively inexpensive oxygen sensor capable of detecting the variation in the amount of oxygen in units of about 0.1% may be adopted in the present embodiment in order to prevent the chattering phenomenon of the detection signal.

In particular, in case of detecting the leakage by applying a pressure sensor, which detects the pressure based on variation of load, to the flexible pipe, it is difficult to drive the pressure sensor by using a built-in battery only.

Therefore, when the pressure sensor is applied to the flexible pipe, it is necessary to supply power from the outside by connecting a separate power line to the outside, and when the pressure sensor is driven by the battery only, the detection unit may have a very short lifespan of less than 2 years due to the limitation in the capacity of the battery.

In addition, when connecting the separate power line to the vacuum line of semiconductor manufacturing equipment, there is a risk of an explosion accident.

Meanwhile, according to the present invention, an oxygen sensor that requires very little driving power compared to the pressure sensor is adopted, so that a lifespan of 2 years or more can be ensured even with the built-in battery only.

Next, a method of manufacturing and operating a flexible pipe according to an exemplary embodiment of the present invention will be described in detail with reference to FIG. 3A-3C.

Figure 3A:
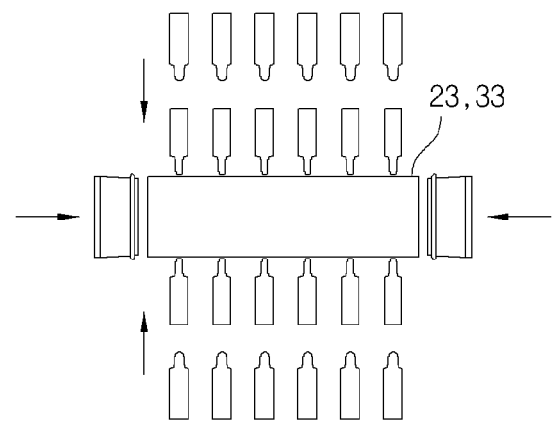
FIGS. 3A-3C are views showing each process step in a method of manufacturing a flexible pipe according to an exemplary embodiment of the present invention.
Figure 3B:
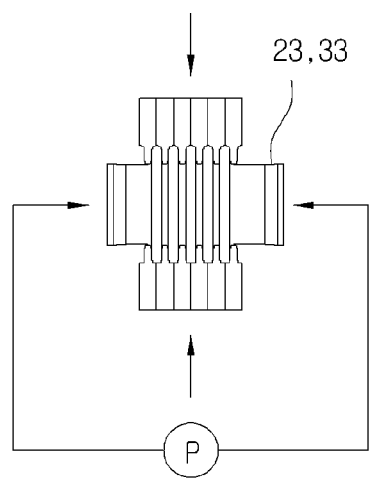
Figure 3C:
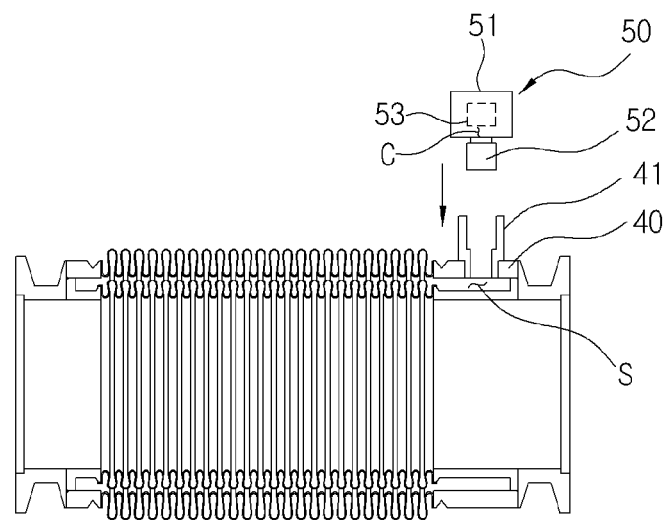

FIGS. 3A-3C are views showing each process step in a method of manufacturing a flexible pipe according to an exemplary embodiment of the present invention.

First, as shown in FIG. 3A, a plate-shaped raw material is formed into a pipe shape to provide an outer pipe 23 and an inner pipe 33, a dedicated tool for processing each of the pipes 23 and 33 into a corrugated pipe having mountains and valleys is disposed around each of the pipes 23 and 33, and both sides of each of the pipes 23 and 33 are pressed to form the mountains and valleys on each of the pipes 23 and 33.

In this case, an inner diameter of the outer pipe 23 may be the same as an outer diameter of the inner pipe 33, or may be formed slightly larger than the outer diameter of the inner pipe 33 so that the inner pipe 33 can be easily inserted.

Then, an inserting process is performed to insert the inner pipe 33 into the outer pipe 23 processed as described above.

Thus, the flexible pipe 10 having a double bellows structure with a corrugated tubular shape may be obtained.

Subsequently, a tubing process may be performed to cut the outer and inner bellows 20 and 30 into a preset length.

In this case, the volume of the atmospheric space S to be formed between the outer and inner bellows 20 and 30, and the length and diameter of the outer bellows 20 and the inner bellows 30 may be variously changed.

As shown in FIG. 3C, a pair of flanges 40 are connected to both ends of the double bellows 12, and the flexible pipe is installed in the vacuum line of semiconductor manufacturing equipment.

In this case, since the flexible pipe 10 is in a state in which pressure is not formed in the pressure space S, the flexible pipe 10 may have flexibly so that the flexible pipe 10 can be easily mounted to the equipment to be installed.

Then, the detection unit 50 is coupled to one side, for example, to the right flange 40.

Thus, the detection space C inside the detection unit 50 may communicate with the atmospheric space S in which the air having the atmospheric pressure is filled between the outer bellows 20 and the inner bellows 30.

As high-temperature gas flows through the inside of the flexible pipe 10 manufactured through the above process, the temperature inside actual equipment, for example, inside semiconductor manufacturing equipment may rise up to about 170 to 200° C., so that the internal pressure and internal temperature of the atmosphere space S may rise.

If the inner bellows 30 is damaged or broken, the amount of oxygen present in the atmospheric space S may be reduced due to a chemical reaction between the oxygen and present in the atmospheric space S and the exhaust gas.

Accordingly, the control terminal may inspect the variation in the amount of oxygen detected by the oxygen sensor 53, and may determine that the leakage occurs when the amount of detected oxygen is lower than the preset reference value.

Through the process as described above, the present invention can detect the leakage due to the damage or breakage of the outer and inner bellows based on the variation in the amount of oxygen present in the space between the outer bellows and the inner bellows.

Therefore, according to the present invention, the flexible pipe can be easily installed in the equipment while securing the flexibility of the flexible pipe, and the leakage can be accurately inspected based on the variation in the amount of oxygen present in the space within the double bellows.

Although the invention made by the present inventor has been described in detail according to the above embodiment, the present invention is not limited to the above embodiment, and can be changed in various ways without departing from the gist of the invention.

That is, although the flexible pipe 10 having the double bellows structure including the outer and inner bellows 20 and 30 has been described in the above embodiment, the present invention is not necessarily limited thereto.

For example, the present invention may adopt an interlock to one or more of the outer and inner bellows 20 and 30, or the present invention can be modified to be applied to the flexible pipe with various shapes and structures having a triple or more bellows or interlocks, as well as the double bellows or interlocks.

The present invention can be applied to the flexible pipe that detects the leakage due to the damage or breakage of the bellows based on the variation in the amount of oxygen present in the space between the outer bellows and the inner bellows, and a method of manufacturing the same.

What is claimed is:

1. A flexible pipe comprising:
   an outer bellows in a corrugated tubular shape having peaks and valleys;
   an inner bellows in a corrugated tubular shape having peaks and valleys, the inner bellows being disposed inside the outer bellows to form an atmospheric space between the outer bellows and the inner bellows;
   a pair of flanges connected to both ends of the outer bellows and the inner bellows; and
   a detection assembly configured for checking whether leakage occurs due to a damage or a breakage of the outer bellows and the inner bellows by detecting an amount of oxygen present in an air filled in the atmospheric space and having an atmospheric pressure,
   wherein the detection unit assembly comprises:
   a body disposed separate from the outer and inner bellows;
   a coupling portion connected to a lower portion of the body and coupled to a coupling rib disposed on one of the pair of flanges;
   an oxygen sensor disposed inside the body and configured to detect the amount of oxygen present in the air filled in the atmospheric space when a detection space formed inside the detection assembly is in communication with the atmospheric space; and
   a control terminal configured to check whether the leakage occurs,
   wherein a maximum outer diameter of the inner bellows is less than or equal to a minimum inner diameter of the outer bellows, such that the inner bellows is inserted into the outer bellows to form a double bellows structure,
   wherein the oxygen sensor is configured to generate a detection signal when detecting the amount of oxygen present in the detection space communicating with the atmospheric space, and
   wherein the control terminal is configured to check whether the leakage occurs based on the detection signal indicating variation in the amount of oxygen, and determine that the leakage occurs when the amount of detected oxygen is lower than a preset reference value.

2. A method of manufacturing the flexible pipe of claim 1, the method comprising:
   (a) forming an outer pipe and an inner pipe by processing a plate-shaped raw material;
   (b) forming the peaks and the valleys on the outer pipe and the inner pipe to provide the outer bellows and the inner bellows, and inserting the inner bellows into the outer bellows, thereby providing the double bellows structure;
   (c) connecting the pair of flanges to both ends of the double bellows structure, and mounting the double bellows structure on an equipment to be installed; and
   (d) coupling the detection assembly having the oxygen sensor to one of the pair of flanges.

* * * * *